(12) United States Patent
Akiike et al.

(10) Patent No.: US 11,319,391 B2
(45) Date of Patent: *May 3, 2022

(54) COMPOSITION FOR NON-AQUEOUS SECONDARY BATTERY ADHESIVE LAYER, NON-AQUEOUS SECONDARY BATTERY ADHESIVE LAYER, LAMINATE, AND NON-AQUEOUS SECONDARY BATTERY

(71) Applicant: ZEON CORPORATION, Tokyo (JP)

(72) Inventors: Junnosuke Akiike, Tokyo (JP); Keiichiro Tanaka, Tokyo (JP); Kazuki Asai, Tokyo (JP); Kei Oura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 536 days.

This patent is subject to a terminal disclaimer.

(21) Appl. No.: 15/777,220

(22) PCT Filed: Nov. 28, 2016

(86) PCT No.: PCT/JP2016/004986
§ 371 (c)(1),
(2) Date: May 18, 2018

(87) PCT Pub. No.: WO2017/094252
PCT Pub. Date: Jun. 8, 2017

(65) Prior Publication Data
US 2018/0351149 A1  Dec. 6, 2018

(30) Foreign Application Priority Data

Nov. 30, 2015 (JP) .............................. JP2015-233885

(51) Int. Cl.
| | | |
|---|---|---|
| C08L 51/00 | (2006.01) |
| C08F 220/18 | (2006.01) |
| C08F 220/44 | (2006.01) |
| C09J 11/08 | (2006.01) |
| H01M 10/058 | (2010.01) |
| C08L 9/06 | (2006.01) |
| C09J 201/00 | (2006.01) |
| H01M 4/13 | (2010.01) |
| C08F 265/08 | (2006.01) |
| H01M 50/409 | (2021.01) |
| H01M 50/449 | (2021.01) |
| C09J 133/10 | (2006.01) |
| H01M 10/0525 | (2010.01) |
| C08F 212/08 | (2006.01) |

(52) U.S. Cl.
CPC .......... *C08F 220/44* (2013.01); *C08F 265/08* (2013.01); *C08L 9/06* (2013.01); *C08L 51/003* (2013.01); *C09J 11/08* (2013.01); *C09J 133/10* (2013.01); *C09J 201/00* (2013.01); *H01M 4/13* (2013.01); *H01M 10/058* (2013.01); *H01M 10/0525* (2013.01); *H01M 50/409* (2021.01); *H01M 50/449* (2021.01); *C08F 212/08* (2013.01); *C08F 220/1804* (2020.02)

(58) Field of Classification Search
CPC .................. C08F 220/44; C08F 265/08; C08F 220/1804; C08F 212/08; C08L 9/06; C08L 51/003; C09J 201/00; C09J 133/10; C09J 11/08; C09J 7/00; C09J 2203/33; H01M 4/13; H01M 2/16; H01M 2/1686; H01M 10/0525; H01M 10/058; H01M 10/0585; H01M 10/0587
USPC ....................................................... 429/144
See application file for complete search history.

(56) References Cited

U.S. PATENT DOCUMENTS

| 2003/0113626 A1* | 6/2003 | Maeda ................. H01M 4/622 429/217 |
| 2010/0047690 A1 | 2/2010 | Tsuchiya et al. |
| 2014/0205904 A1* | 7/2014 | Sasaki ..................... C08L 25/10 429/217 |
| 2015/0030922 A1* | 1/2015 | Kobayashi ............ H01M 4/622 429/217 |

(Continued)

FOREIGN PATENT DOCUMENTS

| JP | 2015041603 | * | 8/2003 |
| JP | 2015026572 A |  | 2/2015 |

(Continued)

OTHER PUBLICATIONS

Feb. 21, 2017, International Search Report issued in the International Patent Application No. PCT/JP2016/004986.

(Continued)

*Primary Examiner* — Christian Roldan
(74) *Attorney, Agent, or Firm* — Kenja IP Law PC

(57) ABSTRACT

Disclosed is a composition for non-aqueous secondary battery adhesive layer which comprises a particulate polymer and a binder, wherein the particulate polymer comprises 5% to 50% by mass of a (meth)acrylonitrile monomer unit and 0.1% to 3.5% by mass of a cross-linkable monomer unit. Also disclosed is a non-aqueous secondary battery adhesive layer prepared by using the composition for non-aqueous secondary battery adhesive layer. Also disclosed is a laminate which comprises a substrate and the non-aqueous secondary battery adhesive layer disposed on at least one side of the substrate either directly or indirectly through one or more other layers. Also disclosed is a non-aqueous secondary battery wherein at least one of a positive electrode, a negative electrode, and a separator comprises the non-aqueous secondary battery adhesive layer.

5 Claims, No Drawings

(56) References Cited

U.S. PATENT DOCUMENTS

2016/0141581 A1    5/2016  Sasaki et al.
2016/0268565 A1*   9/2016  Sasaki .................. H01M 2/166

FOREIGN PATENT DOCUMENTS

| JP | 2015028842 A | | 2/2015 | |
|---|---|---|---|---|
| JP | 2015041603 | * | 3/2015 | .......... H01M 10/052 |
| JP | 2015041603 A | | 3/2015 | |
| JP | 2015088253 A | | 5/2015 | |
| WO | WO-2013146515 A1 | * | 10/2013 | ............ H01M 50/46 |
| WO | 2015005145 A1 | | 1/2015 | |
| WO | 2015064411 A1 | | 5/2015 | |

OTHER PUBLICATIONS

Jul. 4, 2019, the Extended European Search Report issued by the European Patent Office in the corresponding European Patent Application No. 16870193.6.

Jun. 5, 2018, International Preliminary Report on Patentability issued in the International Patent Application No. PCT/JP2016/004986.

* cited by examiner

COMPOSITION FOR NON-AQUEOUS SECONDARY BATTERY ADHESIVE LAYER, NON-AQUEOUS SECONDARY BATTERY ADHESIVE LAYER, LAMINATE, AND NON-AQUEOUS SECONDARY BATTERY

TECHNICAL FIELD

The present disclosure relates to compositions for non-aqueous secondary battery adhesive layer, non-aqueous secondary battery adhesive layers, laminates, and non-aqueous secondary batteries.

BACKGROUND

Recently, portable terminals such as laptop personal computers, cellular phones, and personal digital assistants (PDAs) have become widespread. Lithium ion secondary batteries are widely used for secondary batteries used as a power source of such portable terminals.

A lithium ion secondary battery generally includes a separator for preventing a short circuit between the positive and negative electrodes.

Lithium ion secondary battery members such as the positive electrode, negative electrode and separator are required to have high adhesion in electrolysis solution between the members.

For example, PTL 1 proposes particulate polymers for lithium ion secondary battery binders, adhesive layers containing the particulate polymers and so forth, which exhibit superior adhesion in electrolysis solution and improve low-temperature output characteristics of lithium ion secondary batteries.

CITATION LIST

Patent Literature

PTL 1: WO2015064411A

SUMMARY

Technical Problem

As a result of studies conducted by the inventors, it was found that the adhesive layer described in PTL 1 exhibits superior adhesion in electrolysis solution, but there remains room for improvement in adhesion after a lapse of long time (e.g., 30 days) in electrolysis solution at high temperatures (hereinafter "adhesion after a lapse of long time in electrolysis solution at high temperatures" may be simply referred to as "adhesion over time at high temperatures").

As a result of further studies conducted by the inventors, it was also found that reductions in adhesion over time at high temperatures may also lead to poor low-temperature output characteristics of a non-aqueous secondary battery.

An object of the present disclosure is therefore to provide a composition for non-aqueous secondary battery adhesive layer which can provide an adhesive layer which exhibits limited reduction in adhesion over time at high temperatures. Another object of the present disclosure is to provide a non-aqueous secondary battery adhesive layer which can exhibit limited reduction in adhesion over time at high temperatures. Yet another object of the present disclosure is to provide a laminate which can exhibit limited reduction in adhesion over time at high temperatures. Still yet another object of the present disclosure is to provide a non-aqueous secondary battery having good low-temperature output characteristics.

Solution to Problem

A composition for non-aqueous secondary battery adhesive layer according to the present disclosure comprises a particulate polymer and a binder, wherein the particulate polymer comprises 5% to 50% by mass of a (meth)acrylonitrile monomer unit and 0.1% to 3.5% by mass of a cross-linkable monomer unit. With such a composition, it is possible to obtain an adhesive layer which exhibits limited reduction in adhesion over time at high temperatures.

In a composition for non-aqueous secondary battery adhesive layer according to the present disclosure, an amount of elution of the particulate polymer into electrolysis solution is preferably 0.1% to 10%. This improves adhesion of an adhesive layer whereby an adhesive layer can be obtained which exhibits limited reduction in adhesion over time at high temperatures and also low-temperature output characteristics of a secondary battery improves.

In a composition for non-aqueous secondary battery adhesive layer according to the present disclosure, the particulate polymer preferably has a volume-average particle diameter of 400 to 800 nm. This allows an adhesive layer to have improved adhesion and a secondary battery to have improved low-temperature output characteristics.

A non-aqueous secondary battery adhesive layer according to the present disclosure is prepared by using any of the compositions for non-aqueous secondary battery adhesive layer described above. This allows the adhesive layer to exhibit limited reduction in adhesion over time at high temperatures.

A laminate according to the present disclosure comprises a substrate and the non-aqueous secondary battery adhesive layer disposed at least one side of the substrate either directly or indirectly through one or more other layers. This limits reductions in adhesion over time at high temperatures between battery members.

A non-aqueous secondary battery according to the present disclosure comprises a positive electrode, a negative electrode, a separator, and an electrolysis solution, wherein at least one of the positive electrode, the negative electrode and the separator comprises the non-aqueous secondary battery adhesive layer. This allows the non-aqueous secondary battery to exhibit good low-temperature output characteristics.

A non-aqueous secondary battery according to the present disclosure is preferably of spirally wound or laminate type. This provides an effect of improving the energy density of a secondary battery.

Advantageous Effect

With the present disclosure, it is possible to provide a composition for non-aqueous secondary battery adhesive layer which can provide an adhesive layer which exhibits limited reduction in adhesion over time at high temperatures. With the present disclosure, it is also possible to provide a non-aqueous secondary battery adhesive layer which can exhibit limited reduction in adhesion over time at high temperatures. With the present disclosure, it is possible to provide a laminate which can exhibit limited reduction in adhesion over time at high temperatures. With the present disclosure, it is also possible to provide a non-aqueous secondary battery having good low-temperature output characteristics.

DETAILED DESCRIPTION

Embodiments of the present disclosure will be described below. The descriptions are illustrative purposes only and are not to be construed to limit the scope of the present disclosure.

Unless otherwise indicated, numerical ranges used herein are intended to include the lower and upper limit values of the respective ranges. For example, the range 5% to 50% by mass is intended to include the lower limit value of 5% by mass and the upper limit value of 50% by mass and means 5% by mass or more to 50% by mass or less.

By "(meth)acrylic acid" as used herein is meant at least one compound selected from the group consisting of acrylic acid, methacrylic acid, and combinations thereof. By "(meth)acrylate" as used herein is meant at least one compound selected from the group consisting of acrylate, methacrylate, and combinations thereof. By "(meth)acrylonitrile" as used herein is meant at least one compound selected from the group consisting of acrylonitrile, methacrylonitrile, and combinations thereof. By "(meth)acrylamide" as used herein is meant at least one compound selected from the group consisting of acrylamide, methacrylamide, and combinations thereof.

By "(meth)acrylonitrile monomer unit" as used herein is meant a structural unit formed by polymerizing a (meth)acrylonitrile monomer. By "cross-linkable monomer unit" as used herein is meant a structural unit formed by polymerizing a cross-linkable monomer. A cross-linkable monomer refers to a monomer that may form a cross-linked structure during or after polymerization by heating or irradiation with energy beams. By "(meth)acrylate monomer unit" as used herein is meant a structural unit formed by polymerizing a (meth)acrylate monomer. By "fluorine-containing monomer unit" as used herein is meant a structural unit formed by polymerizing a monomer having fluorine. By "acid group-containing monomer unit" as used herein is meant a structural unit formed by polymerizing a monomer having an acid group. By "aromatic vinyl monomer unit" as used herein is meant a structural unit formed by polymerization of an aromatic vinyl monomer.

In the present disclosure, the amount of elution of particulate polymers into electrolysis solution and the volume-average particle diameter of the particulate polymers are measured made by the methods described in Examples.

By "water-soluble" as used herein for a particular substance is meant that when 0.5 g of the substance is dissolved in 100 g of water at 25° C., the insoluble matter accounts for 0% to less than 1.0% by mass of the substance. By "water-insoluble" as used herein for a particular substance is meant that when 0.5 g of the substance is dissolved in 100 g of water at 25° C., the insoluble matter accounts for 90% to 100% by mass of the substance.

In a polymer produced by copolymerization of more than one monomer in the present disclosure, the proportion of a structural unit formed by polymerization of a monomer in the polymer is consistent with the proportion (blending ratio) of the monomer in the total monomers used for the polymerization of the polymer, unless otherwise indicated.

The term "monomer composition" as used herein is used to refer not only to a composition containing two or more different types of monomers, but also to a single type of a monomer.

(Composition for Non-Aqueous Secondary Battery Adhesive Layer)

A composition for non-aqueous secondary battery adhesive layer according to the present disclosure comprises a particulate polymer and a binder, wherein the particulate polymer comprises 5% to 50% by mass of a (meth)acrylonitrile monomer unit and 0.1% to 3.5% by mass of a cross-linkable monomer unit. With such a composition, it is possible to obtain an adhesive layer which exhibits limited reduction in adhesion over time at high temperatures.

<Particulate Polymer>

The polymer comprises 5% to 50% by mass of a (meth)acrylonitrile monomer unit and 0.1% to 3.5% by mass of a cross-linkable monomer unit. This allows the adhesive layer to exhibit limited reduction in adhesion over time at high temperatures. The reason for this is uncertain but is presumed to be as follows: Such a composition of the particulate polymer limits its dissolution into electrolysis solution and thereby reductions in adhesion over time at high temperatures are limited.

The particulate polymer is not particularly limited so long as it comprises specified amounts of the monomers described above. The particulate polymer may have a core-shell structure having a core and a shell that at least partially covers the outer surface of the core or may have a structure without any shell (non-core-shell structure). The particulate polymer may also comprise a combination of a particulate polymer having a core-shell structure and a particulate polymer having a non-core-shell structure.

In the present disclosure, it is preferred that the particulate polymer has a core-shell structure. For example, as described in PTL1, when the core is formed of a polymer having excellent ion conductivity and the shell is formed of a polymer having excellent adhesion in electrolysis solution, it is possible to effectively enhance both adhesion of the particulate polymer in electrolysis solution and low-temperature output characteristics of a secondary battery.

<Particulate Polymer Having Core-Shell Structure>

Particulate polymers having a core-shell structure will be described below.

<Core>

The monomer units constituting the core of a particulate polymer having the core-shell structure are not particularly limited. In one example, the core comprises one or more monomer units selected from the group consisting of (meth)acrylonitrile monomer unit, cross-linkable monomer unit, (meth)acrylate monomer unit, fluorine-containing monomer unit, and acid group-containing monomer unit, and aromatic vinyl monomer unit. In another example, the core comprises a (meth)acrylonitrile monomer unit and a cross-linkable monomer unit and further comprises one or more monomers units selected from the group consisting of (meth)acrylate monomer unit, fluorine-containing monomer unit, acid group-containing monomer unit, and aromatic vinyl monomer unit.

Monomers for producing the core of a particulate polymer having the core-shell structure are not particularly limited. It is preferred to use, for example, (meth)acrylonitrile monomers, cross-linkable monomers, and (meth)acrylate monomers. Of (meth)acrylate monomers, those containing fluorine are distinguished from (meth)acrylate monomers by treating them as fluorine-containing monomers described later.

(Meth)acrylonitrile monomers are not particularly limited, and acrylonitrile, methacrylonitrile and other (meth)acrylonitrile derivatives can be used.

Examples of cross-linkable monomers include multi-functional monomers having two or more polymerizable groups in the monomer. Examples of such multi-functional monomers include, but not particularly limited to, divinyl compounds such as divinyl benzene; di(meth)acrylate compounds such as ethylene dimethacrylate, diethylene glycol dimethacrylate, ethylene glycol dimethacrylate, diethylene glycol diacrylate, and 1,3-butylene glycol diacrylate; tri (meth)acrylate compounds such as trimethylol propane trimethacrylate, and trimethylol propane triacrylate; and epoxy group-containing ethylenically unsaturated monomers such as allyl glycidyl ether, and glycidyl methacrylate. Of these monomers, dimethacrylate compounds and epoxy group-containing ethylenically unsaturated monomers are preferred, with dimethacrylate compounds being more preferred.

(Meth)acrylate monomers are not particularly limited and those known in the art can be used. Examples of (meth) acrylate monomers include methyl acrylate, ethyl acrylate, butyl acrylate, methyl methacrylate, ethyl methacrylate, and 2-ethylhexyl acrylate.

The core may comprise a fluorine-containing monomer unit. When the core comprises a fluorine-containing monomer unit, it is possible to enhance ion conductivity of the core and effectively enhance ion conductivity of the particulate polymer.

Examples of fluorine-containing monomers include fluorine-containing (meth)acrylate monomers and fluorine-containing aromatic diene monomers, with fluorine-containing (meth)acrylate monomers being preferred. Examples of fluorine-containing (meth)acrylate monomers include compounds represented by the general formula (I) $CH_2=CR^1COOR^2$ (where $R^1$ represents hydrogen or methyl group, and $R^2$ represents fluorine-containing hydrocarbon group). In one example, the hydrocarbon group of $R^2$ has 1 to 18 carbon atoms. $R^2$ has 1 or 2 or more fluorine atoms.

Examples of fluorine-containing (meth)acrylate monomers represented by the general formula (I) include fluorinated alkyl (meth)acrylates, fluorinated aryl (meth)acrylates, and fluorinated aralkyl (meth)acrylates. In one example, fluorine-containing (meth)acrylate monomers are fluorinated alkyl (meth)acrylates. Specific examples of such monomers include perfluoroalkyl (meth)acrylates such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth)acrylate, 1H,1H,9H-perfluoro-1-nonyl (meth)acrylate, 1H,1H,11H-perfluoroundecyl (meth)acrylate, perfluorooctyl (meth)acrylate, perfluoroethyl (meth)acrylate, trifluoromethyl (meth)acrylate, and 3 [4 [1-trifluoromethyl-2,2-bis[bis (trifluoromethyl) fluoromethyl]ethynyloxy]benzoxy]-2-hydroxypropyl (meth)acrylate.

The core may comprise an acid group-containing monomer unit. Examples of acid group-containing monomers include carboxyl group-containing monomers, sulfonate group-containing monomers, phosphate group-containing monomers, and hydroxyl group-containing monomers.

Examples of carboxyl group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth) acryloyloxyethyl phosphate.

Examples of hydroxyl group-containing monomers include 2-hydroxyethyl acrylate, 2-hydroxypropyl acrylate, 2-hydroxyethyl methacrylate, and 2-hydroxypropyl methacrylate.

Of the acid group-containing monomers, preferred are carboxyl group-containing monomers, with monocarboxylic acids being preferred, and (meth)acrylic acid being more preferred.

The core may comprise an aromatic vinyl monomer. Examples of aromatic vinyl monomers include styrene, α-methylstyrene, styrenesulfonic acid, butoxystyrene, and vinylnaphthalene.

The core may also comprise other optional structural unit(s). Examples of such optional structural units include vinyl chloride monomers such as vinyl chloride and vinylidene chloride; vinyl acetate monomers such as vinyl acetate; vinyl amine monomers such as vinyl amine; vinyl amide monomers such as N-vinyl formamide and N-vinyl acetamide; (meth)acrylic acid derivatives; (meth)acrylamide monomers such as acrylamide and methacrylamide; unsaturated dicarboxylic acid monomers; unsaturated carboxylic anhydrides such as maleic anhydride; maleimide; maleimide derivatives such as phenyl maleimide; and diene monomers such as 1,3-butadiene and isoprene.

The monomers described above may be used alone or in combination.

The glass transition temperature of the core is not particularly limited and is, for example, 0° C. or above, 10° C. or above, 20° C. or above, 30° C. or above, or 60° C. or above, and for example, 150° C. or below, 130° C. or below, 110° C. or below, 100° C. or below, 90° C. or below, or 80° C. or below.

The core diameter is, for example, 50% or more, 60% or more, 70% or more, or 80% or more of the volume-average particle diameter (100%) of the particulate polymer and is, for example, 99% or less, 98.5% or less, or 98% or less of the volume-average particle diameter (100%) of the particulate polymer.

The core diameter can be measured as a volume-average particle diameter of a particulate polymer (core) prior to formation of shell, obtained in the process of producing a particulate polymer. "Volume-average particle diameter" refers to a particle diameter where the cumulative volume from the fine side amounts to 50% of the entire volume in a particle size distribution measured by laser diffraction.

<Shell>

The shell at least partially covers the outer surface of the core. In one example, the shell partially covers the outer surface of the core. Even when the outer surface of the core seems to be completely covered by the shell by its appearance, the shell is treated as partially covering the outer surface of the core in cases where the shell has a pore that communicates between inside and outside of the shell. In another example, the shell entirely covers the outer surface of the core.

When the shell partially covers the outer surface of the core, ions present in electrolysis solution can easily enter the core of the particulate polymer. Thus, when the core has high ion conductivity, it is possible to effectively utilize high ion conductivity of the core.

The monomer units constituting the shell are not particularly limited. In one example, the shell comprises one or more monomer units selected from the group consisting of (meth)acrylonitrile monomer unit, cross-linkable monomer unit, (meth)acrylate monomer unit, fluorine-containing monomer unit, acid group-containing monomer unit, and aromatic vinyl monomer unit. In another example, the shell comprises an aromatic vinyl monomer unit.

The shell is not particularly limited but preferably comprises an aromatic vinyl monomer unit. When the polymer constituting the shell comprises an aromatic vinyl monomer unit, the particulate polymer can exhibit high adhesion when immersed into electrolysis solution.

Examples of aromatic vinyl monomers include styrene, α-methylstyrene, styrenesulfonic acid, butoxystyrene, and vinylnaphthalene, with styrene and styrene derivatives such as styrenesulfonic acid being more preferred.

The shell may comprise one or more of the monomer units for core described above.

The glass transition temperature of the shell is not particularly limited and is, for example, 50° C. or above, 60° C. or above, or 70° C. or above, and for example, 200° C. or below, 180° C. or below, 150° C. or below, or 120° C. or below.

The average ratio of shell coverage on the core outer surface is not particularly limited and is, for example, 10% or more, 30% or more, 40% or more, or 60% or more and is, for example, 99.9% or less, 98% or less, 95% or less, 90% or less, or 85% or less. With the average ratio of shell coverage on the core outer surface falling within this range, it is possible to ensure a good balance between ion conductivity and adhesion in electrolysis solution.

The average ratio of shell coverage on the core outer surface can be measured by observing the cross-sectional structure of a particulate polymer, e.g., by the method described in PTL 1.

<Particulate Polymer Having Non-Core-Shell Structure>

Examples of particulate polymers having the non-core-shell structure include single-composition particulate polymers that comprise a (meth)acrylonitrile monomer unit and a cross-linkable monomer unit and additionally comprise, for example, one or more of the monomers units described above, selected from the group consisting of (meth)acrylate monomer unit, fluorine-containing monomer unit, acid group-containing monomer unit, and aromatic vinyl monomer unit <Volume-Average Particle Diameter of Particulate Polymer>

The volume-average particle diameter of the particulate polymer can be adjusted as appropriate. For example, the volume-average particle diameter is 10 nm or more, 100 nm or more, 300 nm or more, 400 nm or more, 420 nm or more, 450 nm or more, 480 nm or more, or 550 nm or more, and for example, 1,000 nm or less, 800 nm or less, 780 nm or less, 750 nm or less, 600 nm or less, or 550 nm or less. With the volume-average particle diameter of the particulate polymer being not less than the lower limit of the above range, the particulate polymer can have improved dispersibility. With the volume-average particle diameter of the particulate polymer being not greater than the upper limit of the above range, the particulate polymer can have increased adhesion in electrolysis solution.

The volume-average particle diameter of the particulate polymer is preferably 400 to 800 nm, and more preferably 450 to 750 nm. With the volume-average particle diameter of the particulate polymer falling within this range, adhesion of the adhesive layer improves, and low-temperature output characteristics of a secondary battery can be improved.

<Method of Preparing Organic Particles>

Methods of preparing a particulate polymer are not particularly limited and any method can be used so long as the particulate polymer comprises 5% to 50% by mass of a (meth)acrylonitrile monomer unit and 0.1% to 3.5% by mass of a cross-linkable monomer unit. For example, a particulate polymer having a core-shell structure can be prepared by stepwise polymerization of monomers for core and shell polymers with the ratios of these monomers being changed over time. Specifically, the particulate polymer can be prepared by continuous, multi-stage emulsion polymerization or multi-stage suspension polymerization wherein e.g., a polymer produced in a previous stage is sequentially covered with a polymer produced in a later stage, as described in PTL 1.

For example, when preparing a particulate polymer having a core-shell structure wherein the core comprises 40% by mass of a (meth)acrylonitrile monomer unit, 1% by mass of a cross-linkable monomer unit, 27% by mass of a (meth)acrylate monomer unit, and 2% by mass of a (meth)acrylic acid monomer unit based on the total mass of the particulate polymer and wherein the shell comprises 30% by mass of an aromatic vinyl monomer unit based on the total mass of the particulate polymer, the four types of monomers for core described above and an aromatic vinyl monomer for shell may be used in the proportions described above for stepwise polymerization.

Methods of preparing a particulate polymer having a non-core-shell structure are not particularly limited. Polymerization may be carried out by using a (meth)acrylonitrile monomer, a cross-linkable monomer and other monomers, and other components such as initiators such that the prepared particulate polymer comprises 5% to 50% by mass of a (meth)acrylonitrile monomer unit and 0.1% to 3.5% by mass of a cross-linkable monomer unit. Any mode of polymerization can be used such as, for example, solution polymerization, suspension polymerization, bulk polymerization, or emulsion polymerization. Any polymerization reaction can be used such as, for example, ionic polymerization, radical polymerization, or living radical polymerization. For emulsion polymerization, seed polymerization using seed particles may be employed.

<Proportions of Monomer Units>

When the particulate polymer has a core-shell structure, the particulate polymer may comprise 5% to 50% by mass of a (meth)acrylonitrile monomer unit and 0.1% to 3.5% by mass of a cross-linkable monomer unit based on the total mass of the particulate polymer (i.e., total mass of core and shell). In one example, the core of the particulate polymer comprises 5% to 50% by mass of a (meth)acrylonitrile monomer unit and 0.1% to 3.5% by mass of a cross-linkable monomer unit and the shell does not comprise such monomer units. In another example, the shell comprises 5% to 50% by mass of a (meth)acrylonitrile monomer unit and 0.1% to 3.5% by mass of a cross-linkable monomer unit and the core does not comprise such monomer units. In yet another example, the core and shell both comprise a (meth)acrylonitrile monomer unit and a cross-linkable monomer unit, wherein the core and shell comprise 5% to 50% by mass of the (meth)acrylonitrile monomer unit and 0.1% to 3.5% by mass of the cross-linkable monomer unit in total.

For particulate polymers having a core-shell structure or a non-core-shell structure as well as for particulate polymers whose core-shell structure comprises 5% to 50% by mass of the (meth)acrylonitrile monomer unit and 0.1% to 3.5% by mass of the cross-linkable monomer unit only in the core, only in the shell or both, in each case, the proportion of the (meth)acrylonitrile monomer unit in the particulate polymer is 5% or more, 10% or more, 15% or more, 20% or more, 25% or more, 40% or more or 42% or more, and 50% or less, 48% or less, 46% or less, 42% or less, or 20% or less by mass of the total mass (or mass in the case of non-core-shell structure) of the particulate polymer. With the proportion of the (meth)acrylonitrile monomer unit being 5% by mass or more, the strength of the particulate polymer improves, so that an adhesive layer having superior adhesion can be obtained. With the proportion of the (meth)acrylonitrile monomer unit being 50% by mass or less, it is possible to limit reductions in adhesion over time at high temperatures.

For particulate polymers having a core-shell structure or a non-core-shell structure as well as for particulate polymers whose core-shell structure comprises 5% to 50% by mass of the (meth)acrylonitrile monomer unit and 0.1% to 3.5% by mass of the cross-linkable monomer unit only in the core, only in the shell or both, in each case, the proportion of the cross-linkable monomer unit in the particulate polymer is 0.1% or more, 0.15% or more, 0.2% or more, 0.3% or more, or 0.7% or more, and 3.5% or less, 3% or less, or 0.7% or less by mass of the total mass (or mass in the case of non-core-shell structure) of the particulate polymer. With the proportion of the cross-linkable monomer unit being 0.1% by mass or more, it is possible to limit reductions in adhesion over time at high temperatures. With the proportion of the cross-linkable monomer unit being 3.5% by mass or less, it is possible to improve adhesion in electrolysis solution of the adhesive layer.

The proportion of the (meth)acrylate monomer unit in the particulate polymer may be adjusted as appropriate and is not particularly limited. The proportion of the (meth)acrylate monomer unit in the particulate polymer is, for example, 15% or more, 17.5% or more, 21% or more, 24% or more, 30% or more or, or 45% or more, and for example, 60% or less, 57% or less, 50% or less, 47% or less, 26% or less, or 25% or less by mass of the total mass (or mass in the case of non-core-shell structure) of the particulate polymer.

The proportion of the (meth)acrylic acid monomer unit in the particulate polymer may be adjusted as appropriate and is not particularly limited. The proportion of the (meth)acrylic acid monomer unit in the particulate polymer is, for example, 0.1% or more, 1% or more, 2% or more, 2.5% or more, 3% or more, or 5% or more, and for example, 20% or less, 15% or less, 10% or less, 5% or less, or 3% or less by mass of the total mass (or mass in the case of non-core-shell structure) of the particulate polymer.

The proportion of the aromatic vinyl monomer unit in the particulate polymer may be adjusted as appropriate and is not particularly limited. The proportion of the aromatic vinyl monomer unit in the particulate polymer is, for example, 1% or more, 5% or more, or 10% or more, and for example, 35% or less, 30% or less, 20% or less, or 15% or less by mass of the total mass (or mass in the case of non-core-shell structure) of the particulate polymer.

<Amount of Elution of Particulate Polymer into Electrolysis Solution>

In compositions for non-aqueous secondary battery adhesive layer according to the present disclosure, an amount of elution of the particulate polymer into electrolysis solution is preferably 0.1% to 10%. This provides an adhesive layer which exhibits limited reduction in adhesion over time at high temperatures. The elution amount is more preferably 0.15% or more, and even more preferably 0.2% or more, but more preferably 8% or less, and even more preferably 6% or less. When the elution amount is 0.1% or more, it is possible to prevent extreme bulging in electrolysis solution so as to retain adhesion of the adhesive layer. When the elution amount is 10% or less, it limits reductions in adhesion over time at high temperatures, and also improves low-temperature output characteristics of a secondary battery.

The particulate polymer is present in particulate form in compositions for non-aqueous secondary battery adhesive layer. In the adhesive layer prepared by using the composition, the form is not particularly limited and the particulate polymer may be present in particulate or any other form.

<Binder>

Binders are not particularly limited and can be selected as appropriate from those known in the art for use in non-aqueous secondary batteries. With the use of binders, it is possible to enhance mechanical strength of the adhesive layer. Further, binders can improve adhesion of the adhesive layer.

For binders, water-insoluble polymers are usually used. Examples of binders include thermoplastic elastomers such as styrene-butadiene copolymers, styrene-acrylonitrile copolymers, and (meth)acrylate polymers. Adhesive layer binders described in PTL 1 may also be used.

The amount of binders may be adjusted as appropriate. For example, binders are added in an amount of 0.1 parts by mass or more or 0.2 parts by mass or more per 100 parts by mass of the particulate binder and in an amount of, for example, 30 parts by mass or less or 20 parts by mass or less per 100 parts by mass of the particulate binder.

<Other Components>

Compositions for non-aqueous secondary battery adhesive layer may comprise other components known in the art for use in adhesive layer compositions. For example, compositions for non-aqueous secondary battery adhesive layer may comprise solvents; water-soluble polymers such as carboxymethylcellulose and salts thereof; non-conductive fibers such as cellulose fiber; non-conductive particles such as alumina particles; isothiazoline compounds; chelate compounds; pyrithione compounds; dispersants; leveling agents; antioxidants; thickeners; antifoaming agents; wetting agents; and additives for electrolysis solution having a function of suppressing decomposition of electrolysis solution.

The solvent can be selected as appropriate from water and organic solvents. It is preferred to use water as solvent. Examples of organic solvents include cyclic aliphatic hydrocarbon compounds such as cyclopentane, and cyclohexane; aromatic hydrocarbon compounds such as toluene, and xylene; ketone compounds such as acetone, ethyl methyl ketone, and cyclohexanone; ester compounds such as ethyl acetate, butyl acetate, γ-butyrolactone, and ε-caprolactone; nitrile compounds such as acetonitrile, and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. These solvents may be used alone or in combination. In one example, the solvent is water.

The amount of the adhesive layer per unit area is not particularly limited and may be adjusted as appropriate. It is preferably 0.1 g/m$^2$ or more, but preferably 1.5 g/m$^2$ or less.

The thickness of the adhesive layer is not particularly limited and may be adjusted as appropriate. The thickness of the adhesive layer is preferably 0.1 μm or more, more preferably 0.2 μm or more, and particularly preferably 0.5

μm or more, but preferably 5 μm or less, more preferably 4 μm or less, and particularly preferably 3 μm or less.

<Method of Preparing Composition for Non-aqueous Secondary Battery Adhesive Layer>

Methods of preparing compositions for non-aqueous secondary battery adhesive layer are not particularly limited. For example, the adhesive layer compositions can be prepared by dissolving or dispersing a particulate polymer, binder and other optional components into solvent. Specifically, a dispersing machine such as ball mill, sand mill, bead mill, pigment disperser, grinding machine, ultrasonic disperser, homogenizer, planetary mixer or FILMIX is used to disperse or dissolve a particulate polymer, binder and other optional components into solvent to prepare a composition for non-aqueous secondary battery adhesive layer.

(Non-Aqueous Secondary Battery Adhesive Layer)

A non-aqueous secondary battery adhesive layer according to the present disclosure is prepared by using the composition for non-aqueous secondary battery adhesive layer described above. This allows the adhesive layer to exhibit limited reduction in adhesion over time. The non-aqueous secondary battery adhesive layer according to the present disclosure may be a layer having at least adhesion and may also have such functions as blocking resistance, heat resistance, and ion diffusion, in addition to adhesion.

A non-aqueous secondary battery adhesive layer according to the present disclosure is applied on at least one side of a substrate (e.g., separator or electrode) with or without other intervening layer(s) to form a battery member having an adhesive layer (laminate). The adhesive layer bonds the battery member and another battery member. In this case, the other battery member may or may not have the adhesive layer.

Depending on the structure of a secondary battery, the adhesive layer may be provided only on one side of a separator or electrode with or without other intervening layer(s) or may be provided on both sides of a separator or an electrode with or without other intervening layer(s). For example, when a separator is used as a substrate, it is preferred to form the adhesive layer on both sides of the separator, and when an electrode is used as a substrate, it is preferred to form the adhesive layer on one side of the electrode, particularly on an electrode mixed material layer.

The non-aqueous secondary battery adhesive layer may be used to bond a battery member and a battery container such as an aluminum packing case (casing).

<Method of Forming Non-Aqueous Secondary Battery Adhesive Layer>

A non-aqueous secondary battery adhesive layer according to the present disclosure can be formed for example by applying the composition for non-aqueous secondary battery adhesive layer described above on at least one side of an electrode or a separator as a substrate, and drying the composition.

<Laminate>

A laminate according to the present disclosure comprises a substrate and the non-aqueous secondary battery adhesive layer disposed at least one side of the substrate either directly or indirectly through other layer(s). This limits reductions in adhesion over time between battery members.

Substrates for the laminate are not particularly limited and can be selected as appropriate from battery member substrates for secondary batteries. Examples include separators, electrodes, and battery containers.

Examples of separator substrates include porous substrates made of resin which comprises polyolefin (e.g., polyethylene, polypropylene, polybutene or polyvinyl chloride) and mixtures and copolymers thereof, or the like; porous substrates made of resin which comprises polyethylene terephthalate, polycycloolefin, polyether sulfone, polyamide, polyimide, polyimideamide, polyaramide, nylon, polytetrafluoroethylene, cellose or the like; woven fabrics formed of fibers of the foregoing resins; non-woven fabrics formed of fibers of the foregoing resins; and aggregates of insulating particles; and combinations thereof.

Examples of electrodes include those described later.

Examples of battery containers include aluminum packing cases.

Other layers which can be optionally provided between the substrate and adhesive layer are not particularly limited and can be selected as appropriate from those known in the art. Examples include porous membranes and heat resistant layers.

<Method of Forming Laminate>

A laminate according to the present disclosure can be formed for example by applying the composition for non-aqueous secondary battery adhesive layer described above on at least one side of an electrode or a separator as a substrate either directly or indirectly through other intervening layer(s), and drying the composition.

(Non-Aqueous Secondary Battery)

A non-aqueous secondary battery according to the present disclosure comprises a positive electrode, a negative electrode, a separator, and an electrolysis solution, wherein at least one of the positive electrode, the negative electrode and the separator comprises the non-aqueous secondary battery adhesive layer. This allows the non-aqueous secondary battery to exhibit good low-temperature output characteristics.

In one example, a non-aqueous secondary battery according to the present disclosure comprises the non-aqueous secondary battery adhesive layer provided on one or both sides of a separator substrate with or without other intervening layer(s). In one example, the positive electrode and separator are bonded and integrated with each other by way of the non-aqueous secondary battery adhesive layer. In another example, the negative electrode and separator are bonded and integrated with each other by way of the non-aqueous secondary battery adhesive layer. In yet another example, the positive electrode, separator, and negative electrode are bonded and integrated with one another by way of the non-aqueous secondary battery adhesive layer.

Positive and negative electrodes, separator and electrolysis solution used in the non-aqueous secondary battery are not particularly limited and can be selected as appropriate from those used in non-aqueous secondary batteries.

The electrodes (positive and negative electrodes) can be, for example, electrodes having an electrode mixed material layer formed on a current collector.

The current collector can be made of metal material such as iron, copper, aluminum, nickel, stainless steel, titanium, tantalum, gold, or platinum.

The current collector for negative electrode is preferably a current collector made of copper.

The current collector for positive electrode is preferably a current collector made of aluminum.

The electrode mixed material layer can be, for example, a layer containing an electrode active material and a binder.

Examples of electrode active materials for positive electrode (positive electrode active materials) include inorganic compounds such as transition metal oxides, composite oxides of lithium and transition metals, and transition metal sulfides; and organic compounds such as conductive polymers such as polyacetylene and poly-p-phenylene.

Examples of transition metals include Fe, Co, Ni, and Mo. Specific examples of inorganic compounds used for positive electrode active materials include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These positive electrode active materials may be used alone or in combination.

Examples of negative electrode active materials include carbonaceous materials such as amorphous carbon, graphite, natural graphite, mesocarbon microbeads, and pitch type carbon fibers; and conductive polymers such as polyacene. Also included are metals such as silicon, tin, zinc, manganese, iron, nickel, and alloys thereof; oxides of the foregoing metals or alloys; and sulfates of the foregoing metals or alloys. Also usable are lithium; lithium alloys such as lithium-Al, Li—Bi—Cd, and Li—Sn—Cd; lithium transition metal nitrides; and silicon. Further, electrode active materials having conductive materials deposited on the surface by mechanical modification may be used. These negative electrode active materials may be used alone or in combination.

The separator is not particularly limited and any separator known in the art can be used. Examples of separators include microporous membranes, porous membranes and nonwoven fabrics which comprise polyolefin resin such as polyethylene, polypropylene, polybutene or polyvinyl chloride, or aromatic polyamide resin; porous resin coats which comprise inorganic ceramic powder; microporous membranes made of resin such as polyethylene terephthalate, polycycloolefin, polyether sulfone, polyamide, polyimide, polyimideamide, polyaramide, nylon or polytetrafluoroethylene or woven fibers of polyolefin, or nonwoven fabrics thereof; aggregates of insulating material particles; and combinations thereof.

The electrolysis solution is not particularly limited and can be selected as appropriate from those known in the art. Typically used is an organic electrolysis solution obtained by dissolving a supporting electrolyte into an organic solvent. For example, when the non-aqueous secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation, with $LiPF_6$ being particularly preferred.

These electrolytes (supporting electrolytes) may be used alone or in combination.

Solvents used for the electrolysis solution are not particularly limited so long as they can dissolve supporting electrolytes and can be selected as appropriate from those known in the art. Examples of solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone, and methyl formate; ethers such as 1,2-dimethoxyethane, and tetrahydrofuran; and sulfur-containing compounds such as sulfolane, and dimethyl sulfoxide.

In one example, the solvent is one or more carbonates selected from the group consisting of dimethyl carbonate, ethylene carbonate, diethyl carbonate, propylene carbonate, butylene carbonate, and ethyl methyl carbonate. In another example, the solvent is a mixed solution of EC and EMC. In yet another example, the solvent is a mixed solution of EC, EMC and DEC. The mixing ratio of solvents in the mixed solutions may be appropriately adjusted Any additive known in the art, such as vinylene carbonate (VC), fluoroethylene carbonate (FEC) or ethyl methyl sulfone, may be added to the electrolysis solution.

The shape of the secondary battery is not particularly limited and can be selected as appropriate. Examples include coin, button, sheet, cylindrical, square, and planar shapes. A non-aqueous secondary battery according to the present disclosure is preferably of spirally wound or laminate type. This provides an effect of increasing the energy density of the secondary battery.

<Method of Manufacturing Non-Aqueous Secondary Battery>

A method of manufacturing a non-aqueous secondary battery according to the present disclosure is not particularly limited except that the non-aqueous secondary battery adhesive layer described above is used for at least one of a positive electrode, a negative electrode, and a separator. Any non-aqueous secondary battery known in the art can be used.

For example, a non-aqueous secondary battery can be manufactured by stacking a positive electrode and a negative electrode with a separator provided therebetween, rolling or folding the resulting laminate as necessary in accordance with the battery shape, placing it in a battery container, filling the battery container with an electrolysis solution, and sealing the container. The non-aqueous secondary battery may also include, for example, an overcurrent preventing device such as a fuse or a PTC device; expanded metal; and/or a lead plate.

Examples

The present disclosure will now be described in detail by way of Examples, which are illustration purposes only and shall not be construed to limit the scope of the present disclosure. Unless otherwise indicated, blending amounts are on a mass basis.

Adhesive layers prepared by using compositions for non-aqueous secondary battery adhesive layer which comprise Particulate Polymers 1 to 10 (later described) and non-aqueous secondary batteries which comprise the adhesive layers are referred to as Examples 1 to 10, respectively. Adhesive layers prepared by using compositions for non-aqueous secondary battery adhesive layer which comprise Comparative Particulate Polymers 1 to 5 (later described) and non-aqueous secondary batteries which comprise the adhesive layers are referred to as Comparative Examples 1 to 5 respectively.

The volume-average particle diameter D50 of each of the particulate polymers was found as a particle diameter (μm) where the cumulative volume from the fine side amounts to 50% of the entire volume in a particle size distribution (volume basis) as measured by a laser diffraction particle size analyzer (LS-230, Beckman Coulter, Inc.) for an aqueous dispersion adjusted to have a solid concentration of 0.1% by mass.

Adhesion (adhesion between the positive electrode and adhesive layer) and adhesion over time of the adhesive layers of Examples and Comparative Examples and low-temperature output characteristics of the secondary batteries of Examples and Comparative Examples were measured and evaluated by the methods described below. The results are set forth in Table 1.

<Adhesion>

A positive electrode and a separator (single side-coated separator) manufactured by the method described later were cut into 10 mm-width pieces and stacked on top of each other such that the adhesive layer of the separator and the positive electrode mixed material layer of the positive layer face each other to prepare a laminate test specimen. The laminate test specimen was immersed in electrolysis solution at 60° C. for 3 days. The electrolysis solution was prepared by dissolving supporting electrolyte $LiPF_6$ into electrolysis solution (composition: ethylene carbonate/ethylmethyl carbonate/diethyl carbonate=30/20/50 (by volume)) to a concentration of 1 mol/L. The laminate test piece was taken out from the electrolysis solution and the electrolysis solution on the surface was wiped off. An adhesive cellophane tape was attached to the surface of the positive electrode with the current collector side surface of the positive electrode facing down. An adhesive cellophane tape specified in JIS Z1522 was used. The adhesive cellophane tape was affixed to a horizontal test stage beforehand. Subsequently, the stress at the time when the separator was peeled by pulling up one end in the vertical direction at a pulling rate of 50 mm/min was measured. The measurement was made 3 times. An average of measured stress values was recorded as peel strength P. In the following criteria, rank A represents best adhesion.

A: 20 N/m≤P
B: 15 N/m≤P<20 N/m
C: 10 N/m≤P<15 N/m
D: P<10 N/m

<Adhesion Over Time>

A laminate test piece was prepared and stress measurement was made 3 times in the same manner as that for the adhesion measurement described above except that the laminate test piece was immersed in electrolysis solution at 60° C. for 30 days. An average of measured stress values was recorded as peel strength p. Adhesion over time T was calculated by using the equation T=p/P. A smaller difference between peel strength p and peel strength P results in a higher T value and therefore higher adhesion over time.

In the following criteria, rank A indicates best adhesion over time.

A: 0.8≤T
B: 0.5≤T<0.8
C: 0.3≤T<0.5
D: T<0.3

<Measurement of Amount of Elution into Electrolysis Solution>

Aqueous dispersions containing particulate polymers prepared by the method described later were provided. The aqueous dispersions were dried in an environment of 50% humidity and 100° C. to prepare films having a thickness of 3±0.3 mm. The produced films were cut into 5 mm squares to prepare film pieces. Approximately 1 g of each film piece was precisely weighed. The mass of the precisely weighed film piece was recorded as W0. The film piece was then immersed in 100 g of electrolysis solution (composition: ethylene carbonate/ethyl methyl carbonate/diethyl carbonate=30/20/50 (by volume)) at 60° C. for 24 hours. Thereafter, the film piece was taken out from the electrolysis solution, washed with methanol, vacuum dried at 105° C. for 3 hours, and its weight (mass of insoluble matter) W1 was measured. The amount (%) of the particulate polymer eluted into the electrolysis solution was calculated by using the following equation:

Elution Amount (%)=100−(W1/W0)×100

<Low-Temperature Output Characteristics>

A spirally wound lithium ion secondary battery with a discharge capacity of 800 mAh manufactured by the method described later was allowed to stand for 24 hours in an environment of 25° C. and charged at 0.1 C and 4.4V for 5 hours in an environment of 25° C. Voltage V0 at that time was measured. The lithium ion secondary battery was then discharged at 1 C in the environment of −10° C. and voltage V1 15 seconds after initiation of discharging was measured. Voltage change ΔV given by the equation ΔV=V0−V1 was calculated. A smaller voltage change ΔV indicates superior low-temperature output characteristics. In the following criteria, rank A indicates best low-temperature characteristics.

A: 500≤ΔV (mV)
B: 500<ΔV (mV)≤700
C: 700<ΔV (mV)≤900
D: 900<ΔV (mV)

<Preparation of Particulate Polymers 1 to 9 and Comparative Particulate Polymers 1 to 5>

Particulate Polymers 1 to 9 and Comparative Particulate Polymers 1 to 5 were prepared according to the procedure described below by using the monomer compositions for core and shell and emulsifiers in amounts set forth in Table 1.

A monomer composition for core; an emulsifier; 150 parts by mass of ion-exchanged water; and 0.5 parts by mass of potassium persulfate as a polymerization initiator were charged into a 5 MPa pressure-resistance vessel equipped with a stirrer and stirred thoroughly. Temperature was raised to 60° C. by heating to initiate polymerization. Polymerization was continued until the polymerization conversion rate reached 96% whereby an aqueous dispersion containing a particulate polymer for core was prepared. The aqueous dispersion was then heated to 70° C. A monomer composition for shell was continuously fed to the aqueous dispersion over 30 minutes to continue polymerization. Once the polymerization conversion rate reached 96%, the reaction was quenched by cooling to prepare an aqueous dispersion containing a particulate polymer. It was confirmed by the observation of a cross section of the particulate polymer that the shell was composed of polymer particles.

<Preparation of Particulate Polymer 10>

Unlike Example 1, a particulate polymer which does not have a core-shell structure was prepared. Specifically, the monomer compositions for core and shell of Example 1; an emulsifier; 150 parts by mass of ion-exchanged water; and 0.5 parts by mass of potassium persulfate as a polymerization initiator as shown in Table 2 were charged into a 5 MPa pressure-resistant vessel equipped with a stirrer and stirred thoroughly. Temperature was raised to 60° C. by heating to initiate polymerization. Polymerization was continued until the polymerization conversion rate reached 96%. The reaction was then quenched by cooling to prepare an aqueous dispersion containing a particulate polymer.

TABLE 1

|  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Monomer composition for core (parts by mass) | Acrylonitrile | 42 | 20 | 10 | 49 | 42 | 42 | 42 | 42 |
|  | Ethylene dimethacrylate | 0.7 | 0.7 | 0.7 | 0.7 | 3.5 | 0.15 | 0.7 | 0.7 |
|  | Methyl methacrylate | 0 | 22 | 32 | 0 | 0 | 0 | 0 | 0 |
|  | Butyl acrylate | 24.5 | 24.5 | 24.5 | 17.5 | 21.7 | 25.05 | 24.5 | 24.5 |
|  | Methacrylic acid | 2.8 | 2.8 | 2.8 | 2.8 | 2.8 | 2.8 | 2.8 | 2.8 |
| Core Emulsifier (parts by mass) | Sodium dodecyl-benzene-sulfonate | 0.3 | 0.3 | 0.3 | 0.3 | 0.3 | 0.3 | 0.5 | 1.0 |
| Monomer composition for shell (parts by mass) | Styrene | 30 | 30 | 30 | 30 | 30 | 30 | 30 | 30 |
| Particulate polymer Volume-average particle diameter (nm) |  | 550 | 550 | 550 | 550 | 550 | 550 | 480 | 420 |
| Evaluation items | Amount eluted into electrolysis solution (%) | 1 | 0.18 | 0.12 | 9 | 0.19 | 9.5 | 1 | 1 |
|  | Adhesion | A | B | C | A | B | A | B | C |
|  | Adhesion over time | A | A | A | B | A | B | A | A |
|  | Low-temperature output characteristics | A | A | A | C | A | C | B | C |

|  |  | Ex. 9 | Comp. Ex. 1 | Comp. Ex. 2 | Comp. Ex. 3 | Comp. Ex. 4 | Comp. Ex. 5 |
| --- | --- | --- | --- | --- | --- | --- | --- |
| Monomer composition for core (parts by mass) | Acrylonitrile | 42 | 60 | 3 | 42 | 42 | 42 |
|  | Ethylene dimethacrylate | 0.7 | 0.7 | 0.7 | 0.05 | 4.5 | 6 |
|  | Methyl methacrylate | 0 | 0 | 39 | 0 | 0 | 0 |
|  | Butyl acrylate | 24.5 | 6.5 | 24.5 | 25.05 | 20.7 | 19.2 |
|  | Methacrylic acid | 2.8 | 2.8 | 2.8 | 2.8 | 2.8 | 2.8 |
| Core Emulsifier (parts by mass) | Sodium dodecyl-benzene-sulfonate | 0.1 | 0.3 | 0.3 | 0.3 | 0.3 | 0.3 |
| Monomer composition for shell (parts by mass) | Styrene | 30 | 30 | 30 | 30 | 30 | 30 |
| Particulate polymer Volume-average particle diameter (nm) |  | 780 | 550 | 550 | 550 | 550 | 550 |
| Evaluation items | Amount eluted into electrolysis solution (%) | 1 | 12 | 1 | 15 | 0.11 | 0.05 |
|  | Adhesion | C | A | D | A | D | D |
|  | Adhesion over time | A | D | B | D | C | D |
|  | Low-temperature output characteristics | A | D | B | C | A | A |

TABLE 2

| | | Ex. 10 |
|---|---|---|
| Monomer composition (parts by mass) | Acrylonitrile | 42 |
| | Ethylene dimethacrylate | 0.7 |
| | Methyl methacrylate | 0 |
| | Butyl acrylate | 24.5 |
| | Methacrylic acid | 2.8 |
| | Sodium dodecylbenzenesulfonate | 0.3 |
| | Styrene | 30 |
| Particulate polymer Volume-average particle diameter (nm) | | 550 |
| Evaluation items | Amount eluted into electrolysis solution (%) | 0.8 |
| | Adhesion | B |
| | Adhesion over time | B |
| | Low-temperature output characteristics | B |

<Preparation of Adhesive Layer Binder>

70 parts by mass of ion-exchanged water, 0.15 parts by mass of sodium lauryl sulfate ("EMAL 2F", Kao Chemicals) as an emulsifier and 0.5 parts by mass of ammonium persulfate were charged into a reactor equipped with a stirrer, the gas phase was purged with nitrogen gas, and the temperature was raised to 60° C. In another vessel, 50 parts by mass of ion-exchanged water, 0.5 parts by mass of sodium dodecylbenzenesulfonate as a dispersant, 95 parts by mass of butyl acrylate as a (meth)acrylate monomer, 2 parts by mass of acrylonitrile, 2 parts by mass of methacrylic acid, and 1 part by mass of N-methylol acrylamide were mixed to afford a monomer mixture. The monomer mixture was continuously added to the reactor over 4 hours to effect polymerization at 60° C. After completion of addition, the reaction mass was stirred for further 3 hours at 70° C., and the reaction was completed to afford a water dispersion containing an adhesive layer binder.

<Preparation of Composition for Non-Aqueous Secondary Battery Adhesive Layer>

To 100 parts by mass of solids of the prepared aqueous dispersion containing a particulate polymer were added 14 parts by mass of solids of the prepared aqueous dispersion containing an adhesive layer binder, 2 parts by mass of solids of ethylene oxide-propylene oxide copolymer (solid concentration: 70% by mass, polymerization ratio: 5/5 (by mass)), and 0.0005 parts by mass of solids of 1,2-benziso-thiazolin-3-one (solid concentration: 5.0% by mass) and ion-exchanged water was further mixed so that the solid concentration was 15% by mass to prepare a slurry composition for non-aqueous secondary battery adhesive layer.

<Preparation of Separator>

As a separator for evaluating low-temperature output characteristics of a secondary battery, a polyethylene porous substrate (16 μm thickness; Gurley value: 210 s/100 cc) was provided as a separator substrate. The prepared composition for non-aqueous secondary battery adhesive layer was applied on both sides of the separator substrate by spin coating and dried at 50° C. for 1 minute. In this way, adhesive layers of 1 μm thickness each were formed on both sides of the separator substrate to prepare a coated separator. As separators for evaluating adhesion and adhesion over time, coated separators having an adhesive layer similarly formed only on one side of a separator substrate were prepared.

<Preparation of Negative Electrode>

A 5 MPa pressure-resistant vessel equipped with a stirrer was charged with 33.5 parts by mass of 1,3-butadiene, 3.5 parts by mass of itaconic acid, 62 parts by mass of styrene, 1 part by mass of 2-hydroxyethyl acrylate, 0.4 parts by mass of sodium dodecylbenzene sulfonate as an emulsifier, 150 parts by mass of ion-exchanged water, and 0.5 parts by mass of potassium persulfate as a polymerization initiator. After fully stirred, the temperature was raised to 50° C. to initiate polymerization. Once the polymer conversion rate reached 96%, the reaction was quenched by cooling to afford a mixture containing a particulate binder (SBR). After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or below to afford a water dispersion containing a particulate binder.

Next, 100 parts by mass of synthetic graphite (volume-average particle diameter D50: 15.6 μm) as a negative electrode active material, 1 part by mass of solids of 2% aqueous solution of sodium salt of carboxymethyl cellulose ("MAC350HC" from Nippon Paper Industries Co., Ltd) as a thickener and ion-exchanged water were mixed to a solid concentration of 68% and mixed for 60 minutes at 25° C. to afford a mixture. Subsequently, the mixture was adjusted to have a solid concentration of 62% by the addition of ion-exchanged and further mixed at 25° C. for 15 minutes. To the mixture obtained were added 1.5 parts by mass of solids of the water dispersion containing the particulate binder and ion-exchanged water to a final solid concentration of 52% and further mixed for 10 minutes. The mixture was subjected to defoaming treatment under reduced pressure to afford a secondary battery negative electrode composition with good fluidity.

The secondary battery negative electrode composition was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. The copper foil was then heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness.

<Preparation of Positive Electrode>

100 parts by mass of LiCoO$_2$ (volume-average particle diameter D50: 12 μm) as a positive electrode active material, 2 parts by mass of acetylene black ("HS-100" from Denka Company Ltd.) as a conductor, and 2 parts by mass of solids of polyvinylidene difluoride ("#7208" from KUREHA Corporation) as a binder were mixed, and N-methyl pyrrolidone was then added to the mixture to a total solid concentration of 70%. These materials were mixed with a planetary mixer to prepare a secondary battery positive electrode composition.

The secondary battery positive electrode composition was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. The aluminum foil was then heat-treated for 2 minutes at 120° C. Thus, a web of positive electrode was obtained. The pre-press web of positive electrode was rolled with a roll press to afford a post-press positive electrode in which the positive electrode mixed material layer is 80 μm in thickness.

<Manufacture of Non-Aqueous Secondary Battery>

The positive electrode, coated separator, and negative electrode prepared above were cut into a 49 cm×5 cm piece, a 55 cm×5.5 cm piece, and a 50 cm×5.2 cm piece, respectively. The positive and negative electrodes were placed such that the positive electrode mixed material layer faces one of the adhesive layers provided on both sides of the separator and the negative electrode mixed material layer faces the other adhesive layer to prepare a laminate of positive electrode/separator/negative electrode. Using a winder, this laminate was wound into a roll. The roll was pressed at 70° C. for 8 seconds under a pressure of 1.0 MPa into a flat form and enclosed by an aluminum packaging case as a battery outer package. Electrolysis solution (composition: ethylene carbonate/ethylmethyl carbonate/diethyl carbonate=30/20/50 (by volume); electrolyte: 1M LiPF$_6$) was injected so as not to leave air. In order to tightly seal up the opening of the aluminum outer package, the aluminum package was closed by heat sealing at 150° C. In this way a spirally wound lithium ion secondary battery with a discharge capacity of 800 mAh was manufactured.

It can be seen from Table 1 that Comparative Examples 1 and 3 exhibited good adhesion but low adhesion over time. For Comparative Example 1, this appears to be because although the particulate polymer comprises an appropriate proportion of a cross-linkable monomer unit, it comprises a high proportion of a (meth)acrylonitrile monomer unit, resulting in large amounts of the particulate polymer present in the adhesive layer eluting into electrolysis solution at high temperatures. Similarly, for Comparative Example 3, this appears to be because although the particulate polymer comprises an appropriate proportion of a (meth)acrylonitrile monomer unit, it comprises a low proportion of a cross-linkable monomer unit, resulting in large amounts of the particulate polymer eluting into electrolysis solution at high temperatures. It can be seen from the results of Examples set forth in Table 1 that lower elution amounts (particularly when 1% or less) resulted in better adhesion over time. It can be seen from the result of Example 10 set forth in Table 2 that a particulate polymer having a non-core-shell structure also exhibited good adhesion over time. Comparative Examples 4 and 5 exhibited low elution amount, but also reduced adhesion over time which appears to be due to low initial adhesion which led to high degrees of adhesion reduction after a lapse of long time in the electrolysis solution at high temperatures. Secondary batteries which comprise an adhesive layer having superior adhesion over time such as that prepared in Example 1 also had good low-temperature output characteristics.

With the present disclosure, it is possible to provide a composition for non-aqueous secondary battery adhesive layer which can provide an adhesive layer which exhibits limited reduction in adhesion over time at high temperatures. With the present disclosure, it is also possible to provide a non-aqueous secondary battery adhesive layer which can exhibit limited reduction in adhesion over time at high temperatures. With the present disclosure, it is also possible to provide a non-aqueous secondary battery having good low-temperature output characteristics.

The invention claimed is:

1. A composition for a non-aqueous secondary battery adhesive layer, comprising a particulate polymer and a binder,
   wherein the particulate polymer consists of 5% to 50% by mass of a (meth)acrylonitrile monomer unit, 15% to 60% by mass of a (meth)acrylate monomer unit, 0.1% to 20% by mass of a (meth)acrylic acid monomer unit, 1% to 35% by mass of an aromatic vinyl monomer unit and 0.1% to 3.5% by mass of a cross-linkable monomer unit,
   the particulate polymer has a core-shell structure having a core and a shell that at least partially covers an outer surface of the core;
   wherein the particulate polymer has a volume-average particle diameter of 400 to 800 nm;
   wherein a glass transition temperature of the core is 0° C. or above or 150° C. or below and a diameter of the core is 50% or more or 99% or less of the volume-average particle diameter (100%) of the particulate polymer;
   wherein a glass transition temperature of the shell is 50° C. or above or 200° C. or below and the shell coverage on the core outer surface is 10% or more or 99% or less; and
   an amount of elution of the particulate polymer into electrolysis solution is 0.1% to 10%, wherein the amount of elution of the particulate polymer into the electrolysis solution is calculated by using equation (1):

$$\text{Elution Amount (\%)} = 100 - \left[\left(\frac{W_1}{W_0}\right) \times 100\right] \quad (1)$$

where aqueous dispersions containing the particulate polymer are dried to prepare a film piece, $W_0$ is a mass of the film piece measured before an immersion process, $W_1$ is a mass of the film piece measured after the immersion process, a composition of the electrolysis solution is ethylene carbonate/ethyl methyl carbonate/diethyl carbonate=30/20/50 (by volume), and the immersion process comprises immersing 1 g of the film piece in 100 g of the electrolysis solution at 60° C. for 24 hours.

2. A non-aqueous secondary battery adhesive layer prepared by using the composition for non-aqueous secondary battery adhesive layer according to claim 1.

3. A laminate comprising a substrate and the non-aqueous secondary battery adhesive layer according to claim 2 disposed on at least one side of the substrate either directly or indirectly through one or more other layers.

4. A non-aqueous secondary battery comprising a positive electrode, a negative electrode, a separator, and an electrolysis solution,
   wherein at least one of the positive electrode, the negative electrode, and the separator comprises the non-aqueous secondary battery adhesive layer according to claim 2.

5. The non-aqueous secondary battery according to claim 4, wherein the non-aqueous secondary battery is of spirally wound or laminate type.

* * * * *